United States Patent
Danieli et al.

(10) Patent No.: US 8,700,922 B2
(45) Date of Patent: Apr. 15, 2014

(54) SYSTEM AND METHOD FOR ENERGY AND ASSETS SAVING AND FOR IMPROVING OWNERSHIP AND SUSTAINABILITY AWARENESS

(75) Inventors: Yuval Danieli, Raanana (IL); Maimon Dahan, Tel-Aviv (IL)

(73) Assignee: CA, Inc., Islandia, NY (US)

( * ) Notice: Subject to any disclaimer, the term of this patent is extended or adjusted under 35 U.S.C. 154(b) by 864 days.

(21) Appl. No.: 12/203,033

(22) Filed: Sep. 2, 2008

(65) Prior Publication Data

US 2010/0058093 A1 Mar. 4, 2010

(51) Int. Cl.
*G06F 1/32* (2006.01)
(52) U.S. Cl.
USPC ............ 713/300; 713/320; 713/323; 713/324
(58) Field of Classification Search
USPC .......................... 713/300, 320, 322, 323, 324
See application file for complete search history.

(56) References Cited

U.S. PATENT DOCUMENTS

| | | | | |
|---|---|---|---|---|
| 5,944,782 A | * | 8/1999 | Noble et al. | 709/202 |
| 6,937,946 B1 | * | 8/2005 | Culp et al. | 702/62 |
| 2002/0178387 A1 | * | 11/2002 | Theron | 713/300 |
| 2003/0009705 A1 | * | 1/2003 | Thelander et al. | 713/340 |
| 2009/0061954 A1 | * | 3/2009 | Syed | 455/574 |

\* cited by examiner

*Primary Examiner* — Paul Yanchus, III
(74) *Attorney, Agent, or Firm* — Baker Botts, LLP

(57) ABSTRACT

A method includes linking an owner to an electronic asset using an owner profile. The electronic asset may be coupled to a server through a network. A usage of the electronic asset may be monitored using an activities agent installed on the electronic asset and the agent may monitor a power mode of the electronic asset and usage statistics. A policy may be defined at the server including a first inactivity condition that, when satisfied by the usage statistics of the electronic asset, results in a first alert being generated by the agent indicating inactivity of the electronic asset. The policy may be communicated from the server to the agent, and the agent may determine whether the inactivity condition is satisfied by comparing the usage statistics against the first inactivity condition. When the first inactivity condition is satisfied, the alert may be received at the server from the first agent.

17 Claims, 2 Drawing Sheets

200

Organization 101

| Ownership | Financial | IT | Compliance | .... |

Search: [            ]  Filter   More

| 202 | 204 | 206 | 208 | 210 | 212 |
|---|---|---|---|---|---|
| Asset | Type | Location | Owner | Status | Policy |
| CPU1 | Personal computer | Seattle OFFICE | T.J. Randers | Standby Mode | Power Policy 2 |
| CPU2 | Personal computer | Chicago Office | Brandon Smith | Active | Power Policy 3 |
| Printer 1 | Printer | Seattle Office | IT Department | Active | None |
| . | . | . | . | . | . |
| . | . | . | . | . | . |
| . | . | . | . | . | . |
| Asset N | Type N | Location N | Owner N | Status N | Policy N |

SYSTEM AND METHOD FOR ENERGY AND ASSETS SAVING AND FOR IMPROVING OWNERSHIP AND SUSTAINABILITY AWARENESS

TECHNICAL FIELD

The present disclosure relates generally to energy management and more particularly to a system and method for energy and assets saving and for improving ownership and sustainability awareness.

BACKGROUND

Many organizations may have thousands of assets such as of lab servers, computers, or other electronic assets in full operation mode 24 hours a day, 7 days a week, 365 days of the year. A majority of these assets may rarely be accessed but may always be kept on "just in case" they may be needed in the future. Consequently, asset oversight may be one field of endeavor where organizations may streamline costs by reducing inefficient resource usage.

SUMMARY

The present disclosure relates generally to a system and method for energy and assets saving and for improving ownership and sustainability awareness. In particular embodiments, a method for centralized power management may include linking an owner to an electronic asset using an owner profile stored in a memory. The electronic asset may be coupled to a server through a network. A usage of the electronic asset may be monitored using an activities agent installed on the electronic asset and the agent may be operable to monitor usage statistics and a power mode of the electronic asset. The usage statistics may indicate whether the electronic asset is performing an action. The method may further include defining a policy at the server comprising a first inactivity condition that, when satisfied by the usage statistics of the electronic asset, results in a first alert being generated by the agent indicating inactivity of the electronic asset and communicating the policy from the server to the agent. At the agent, it may be determined whether the inactivity condition is satisfied by comparing the usage statistics against the first inactivity condition and, when the first inactivity condition is satisfied, the first alert may be received at the server from the agent.

In particular embodiments, the policy may further include a first power management activity to be initiated at the electronic asset by the agent when the first inactivity condition is satisfied. When the first inactivity condition is satisfied, the method may further include initiating the first power management activity at the electronic asset which may include lowering the power mode of the electronic asset.

In particular embodiments, the policy may further include a second inactivity condition that, when satisfied by the usage statistics of the electronic asset, results in a second power management activity being initiated after the first power management activity by the agent. Furthermore, a second alert may be received at the server from the agent when the second power management activity is initiated by the agent, the second alert indicating the initiation of the second power management activity, and the second alert may be communicated to the owner.

In particular embodiments, permission may be requested from the owner to initiate the first power management activity before initiating the first power management activity at the electronic asset and the agent may wait to receive instructions from the owner before initiating the first power management activity at the electronic asset.

In particular embodiments, the first alert may be recorded at the server in a collection of alerts received from the agent and the method may further include determining from the collection of alerts that the electronic asset is being inefficiently used. Furthermore, in particular embodiments, a workflow order may be issued notifying a user to disconnect the electronic asset if it is determined that the electronic asset is being inefficiently used.

In particular embodiments, the action may include a user-initiated action and the inactivity condition may include a duration of inactive time elapsed since the electronic asset last performed the user-initiated action and the method may further include communicating the first alert to the owner. Furthermore, the alert may indicate a duration of inactive time elapsed since the electronic asset last performed the user-initiated action.

In particular embodiments, the method may include defining the policy by enabling a user to define the policy.

In particular embodiments, the method may further include reporting a current power mode of the electronic asset may to the owner through a web page and awaiting an instruction from the user to change the current power mode of the electronic asset. Furthermore, the agent may be instructed to change the current power mode of the electronic asset in accordance with the instruction when the instruction is received.

In particular embodiments, the electronic asset may be one of a plurality of electronic assets linked to the owner using the owner profile and coupled to the server through the network.

Technical advantages of particular embodiments of the present disclosure may include increasing employee awareness of the power consumption of assets 104 by linking assets 104 to owners using owner profiles. Another technical advantage may include reducing an organization's expenditures on new assets by enabling a central server to analyze the usage of the organization's existing assets to identify unused assets that may be reclaimed by the organization instead of buying new assets. Yet another technical advantage may include providing a way to ensure that an organization's assets are in compliance with various power management directives or regulations by providing one or more power management policies which standardize power management activities across groups of assets 104. Another technical advantage may include providing an asset owner with the ability to monitor and modify the current power mode of the electronic asset remotely using a web interface.

Furthermore, by enabling organization identify and reclaim unused assets, particular embodiments of the present disclosure may further enable the organization to reduce electricity and energy consumption, reduce heat dissipation, reduce by-product energy waste and pollution, reduce organization operational expenses, increase re-use of equipment, increase employee awareness for possible energy and monetary savings, reduce real-estate used for idle machines, reduce packaging and transportation waste and pollution caused by acquiring unnecessary equipment, increase revenue through recycling or reselling of old and unused machines, and increase environmental and sustainability awareness.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

During the course of its operations, an organization (e.g., a company, a nonprofit organization, a university, a hospital, etc.) may acquire and manage numerous electronic assets 104 (e.g., personal computers, servers, printers, etc.) which may be used by members of the organization (e.g., employees) to accomplish various tasks of the organization. In a typical scenario, an employee of the organization may request an electronic asset 104 or group of electronic assets 104 to perform a certain task. In response, the organization may dedicate the requested electronic asset(s) 104 (e.g., asset 104b) to the employee to enable the employee to achieve the task. Thus, the employee may become the temporary "owner" of asset 104b while working to accomplish his task.

After a period peak activity has passed (e.g., after the task has been accomplished), asset 104b's configuration may be kept untouched by the owner so that the owner or other users may quickly address other issues that might arise down the road using asset 104b. Over time, the owner may continue on with other pressuring activities that do not involve asset 104b but may continue to keep asset 104b intact (e.g., in operation), for example, to save re-setup time or to retain knowledge of the older setup or configuration of asset 104b. Additionally, while asset 104b may have a preloaded power management program, it may not be configured to properly manage the power consumption of asset 104b during periods of inactivity. Consequently, though asset 104b may have served its purpose and though the owner may have no further dedicated use for asset 104b, the owner may keep asset 104b running just in case the owner needs to use asset 104b in the future.

In the meantime, the organization may continue to pay for electricity to power, cool, and maintain asset 104b despite the fact that asset 104b may not be in productive use. Moreover, the organization may purchase additional assets 104 to perform tasks for which the asset 104b would suffice, not knowing that asset 104b is no longer being used by the owner to accomplish his task. As time progresses and the organization dedicates other assets 104 to other owners, the organization may accumulate numerous assets 104 operating in an idle state, for example, because owners feel that a future need may arise for their assets 104, because owners have little or no motivation to turn off their assets 104, because owners have forgotten to turn off their assets 104, or because no one is watching over assets 104. In any case, the organization may suffer from wasted resources expended as a result of assets 104 that are not being used.

Figure 1:
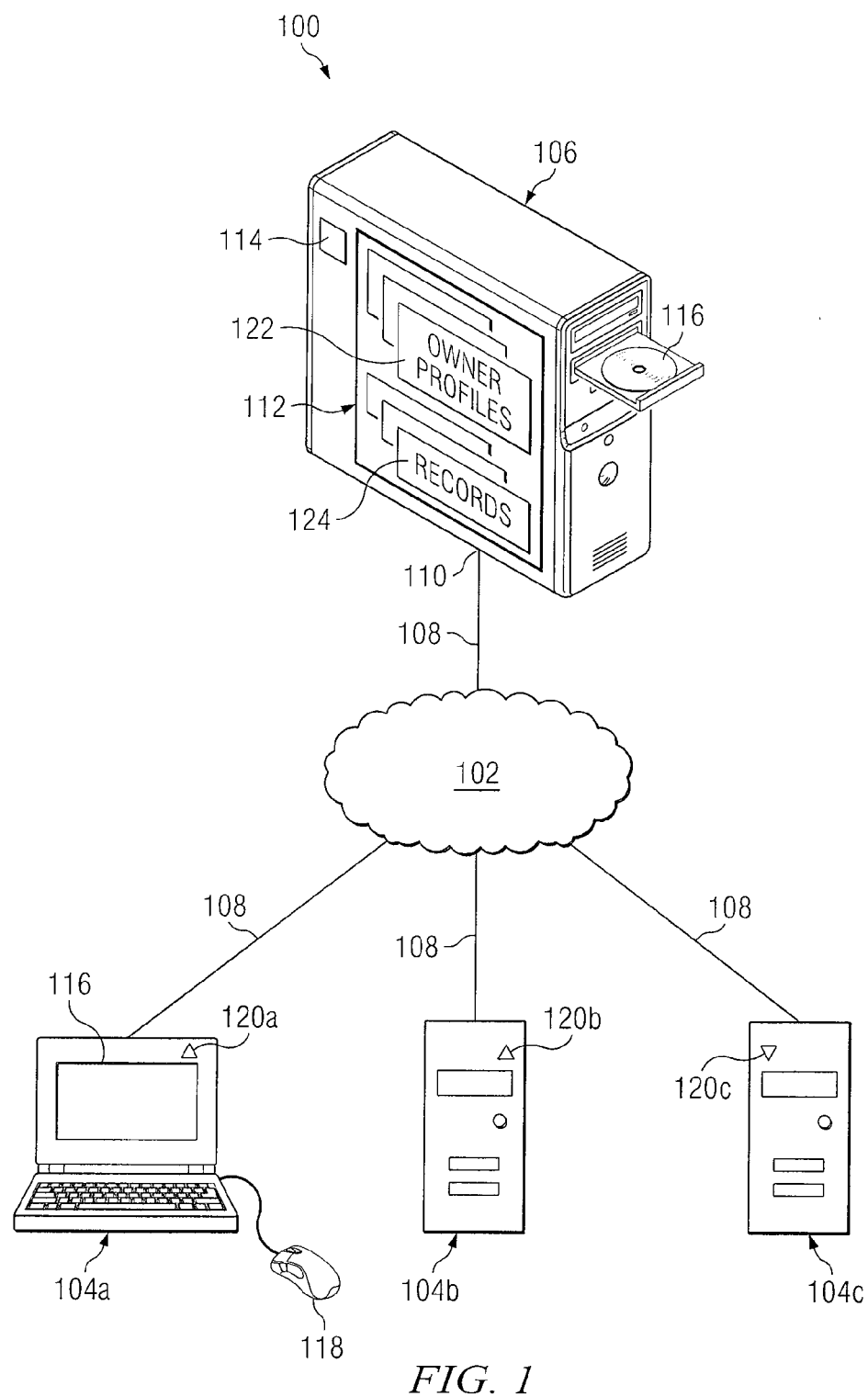
FIG. 1 illustrates an example system for accountable resource usage according to an example embodiment of the present disclosure.

FIG. 1 illustrates an example system 100 for providing an organization with accountable resource usage of its electronic assets 104. More particularly, system 100 includes a plurality of electronic assets 104 operated by the organization and a central server 106 that may be used by the organization to manage its assets 104 through a network 102. In particular embodiments, assets 104 may be organized in central server 106 using, for example, one or more owner profiles 122 that may link assets 104 to various owners (e.g., individual people, or departments) within the organization. An owner could be for example a person or group within the organization to whom an asset 104 or group of assets 104 has been assigned. Thus, an owner profile 122 may indicate each of the assets 104 assigned to a particular owner within the organization in order, for example, to promote accountable resource usage of assets 104 within the organization.

Each electronic asset 104 may be any component of power consuming hardware or combination of such components capable of being electronically monitored by central server 106 through network 102. As an example and not by way of limitation, an asset 104 may be a personal computer (104a), a server (104b), a printer (104c), a disk, a hardware appliance, an attached peripheral, or other component of hardware or software capable of being electronically monitored by server 106. For reference purposes particular embodiments of the present disclosure may be described with reference to a generic asset 104 that may individually represent any of the assets described above.

Assets 104 may operate independently of one another, and may include varying levels of hardware and software that may enable assets 104 to make use of one or more power management features installed therein. As an example and not by way of limitation, an asset 104 may include a power management program having various power modes (e.g., standby mode, hibernate mode) that may enable asset 104 to shutdown or temporarily deactivate certain of its features in order, for example, to save power during periods of inactivity. For example, if asset 104 is a computer, the standby power mode may turn off the computer screen or other computer components after a predetermined period of inactivity. As the period of inactivity increases, asset 104 may progress through a series of power modes which successively deactivate more and more features and components of asset 104 until finally asset 104 turns off. Thus, the power mode of asset 104 may change over time according to the usage of asset 104.

In particular embodiments, the activity of asset 104 may be monitored, for example, using one or more usage statistics (e.g., "Vital Life Signs") gathered from asset 104. Usage statistics may include any indicator(s) suitable for indicating whether asset 104 is being used to perform an activity. The activity could be, for example, a routine activity such as an automatically-initiated maintenance scan or a productive activity such as a user-initiated activity (e.g., a user logging into a server asset 104 and using an application). Though usage statistics may vary depending upon the type of asset 104 being monitored, example usage statistics may include logon activities, remote access activities (e.g., remote control, MS Remote Desktop, X-Windows, Telnet, VNC, etc.), specific protocols activities (e.g., LDAP, ODBC, etc.), specific applications and services activities (e.g., whether an application is running), and system activities (e.g., disk usage, CPU usage, and memory usage activities). In particular embodiments, usage statistics may be used to determine an amount of time that has elapsed since asset 104 was last used to perform an activity. Such information may be used, for example, to determine whether asset 104 is being put to beneficial use or whether asset 104 is simply operating in an idle state.

In particular embodiments, server 106 may provide a central hub for real-time monitoring, tracking, and reporting of the actual usage and status of assets 104. Moreover, in particular embodiments, server 106 may further act on such information to implement various power management activities across assets 104. In particular embodiments, central server 106 may monitor the usage and status (e.g., power mode) of assets 104 and implement power management activities at asset 104 using a plurality of activities agents 120 distributed across assets 104. As an example and not by way of limitation, each asset 104 may include an agent 120 capable of monitoring the usage and status of asset 104 and delivering such information to server 106 (e.g., in a client/server architecture), for example in the form of alerts and events. For reference purposes, particular embodiments of the present disclosure may be described with reference to a generic agent 120 individually installed on asset 104.

In particular embodiments, agent 120 may send alerts to server 106 to notify server 106 of particular events that occur at asset 104. Such events could include for example, a change in the power mode of asset 104, a period of inactivity at asset 104, or a notification that agent 120 is initiating a power management activity at asset 104. By issuing alerts to server 106 regarding events or conditions that occur at asset 104, agent 120 may be used for event collection and monitoring purposes. For example, server 106 may record these alerts in a database of alerts associated with assets 104 and may analyze the alerts associated with asset 104 to determine, for example, if asset 104 is inactive or is being used inefficiently. Server 106 may continuously communicate with agent 120 to maintain up-to-date information regarding asset 104, and in particular embodiments, may act upon the information received from agent 120 by instructing agent 120 to initiate a power management activity to reduce the power consumption of asset 104.

In particular embodiments, agent 120 may be an independent software program installed on asset 104 that gathers usage statistics from asset 104. As an example and not by way of limitation, agent 120 may collect usage statistics from asset 104 by interacting with a preexisting power management program on asset 104. As an additional example and not by way of limitation, agent 120 may independently gather usage statistics from asset 104 without the assistance of any preexisting power management programs. Agent 120 may constantly gather usage statistics from asset 104 on a real-time basis or agent 120 may gather usage statistics periodically by polling asset 104 on a predetermined polling interval. In any case, after gathering usage statistics from asset 104, agent 120 may analyze the usage statistics to determine whether asset 104 is operating in an idle state and may, for example, send an alert to server 106 if asset 104 is idle beyond a predefined period.

To determine whether asset 104 is operating in an idle state, agent 120 may, for example, compare usage statistics from asset 104 against a policy stored at agent 120 containing a set of rules and conditions that may govern how asset 104 is managed. For example, in the context of power management, a policy may include one or more predefined inactivity conditions that, when satisfied by the usage statistics from asset 104, indicate that asset 104 is operating in an idle state. The policy may further include one or more responsive actions to be initiated (e.g., automatically initiated) if an inactivity condition is satisfied by asset 104. For example, if asset 104 is operating in an idle state, the policy may instruct agent 120 to respond by sending an alert to server 106 describing the nature of the inactivity (e.g., the length of inactive time) or to initiate a power management activity. In particular embodiments, the alerts may be passed on from server 106 to a member of the organization (e.g., the owner of asset 104), for example, to keep the owner appraised of the status (e.g., current power mode) of asset 104 or to request permission to initiate a power management activity at asset 104.

In particular embodiments, if server 106 stops receiving communications from agent 120, server 106 may issue a workflow request to an administrator of asset 104 instructing the administrator to check asset 104. However, if the last communication received from agent 120 informed server 106 that asset 104 was being shut off, then server 106 may expect to receive no further communications from agent 120 until asset 104 is reactivated.

As mentioned above, server 106 and/or agent 120 may determine that asset 104 is inactive by comparing information regarding the usage of asset 104 against a predefined policy containing one or more inactivity conditions. Inactivity conditions may be any suitable criteria established, for example, by the organization to indicate that asset 104 is operating in an idle state. As an example and not by way of limitation, an inactivity condition may indicate that asset 104 is operating in an idle state if a predetermined amount of time has passed since asset 104 last performed a user-initiated activity (e.g., sent a fax) or received user input (e.g., received keyboard or mouse input). One of ordinary skill in the art will appreciate that the above-described inactivity conditions were presented for the sake of explanatory clarification and will further appreciate that the present disclosure contemplates using any suitable number and type of inactivity conditions to identify that asset 104 is operating in an idle state.

In particular embodiments, a policy may include a chronological series of inactivity conditions that trigger a corresponding sequence of responsive actions (e.g., power management activities) to be initiated by agent 120 at asset 104 as each inactivity condition is satisfied. Each power management activity in the sequence may render asset 104 less active that the previous power management activity. As an example and not by way of limitation, a policy may include a first inactivity condition, the occurrence of which, results asset 104 being put into standby mode after a first predetermined amount of inactive time has passed, and a second inactivity condition, the occurrence of which, may result in asset 104 being shut off after a second predetermined amount of inactive time has passed.

In particular embodiments, policies may be developed and deployed using server 106. For example, a user (e.g., a member of the organization) may access server 106 and develop a power management policy for a particular group of assets 104. Once a power management policy has been developed, the user may link the power management policy to the group of assets 104 and deploy the policy to the group of assets 104 (e.g., using agents 120) over network 102. In particular embodiments, any suitable criteria may be used to define a group assets 104. For example, assets may be grouped by type, by owner, by location, or by any other suitable criteria. In particular embodiments, a user may associate different policies with different groups of assets 104. For example a first type of assets 104 (e.g., personal computers) may be governed by a first policy and a second type of assets 104 (e.g., web servers) may be governed by a second policy. Thus, policies (e.g., power management policies) may be used, for example, to implement a standard set of inactivity conditions and power management activities across groups of assets 104.

By enabling the organization to standardize power management across groups of assets 104, system 100 may enable the organization to configure most or all of its assets 104 to implement power management activities, even if such assets 104 were not originally configured to do so. For example, the organization may use system 100 to configure preexisting power management programs on assets 104 that, for many reasons, might not be configured correctly and allow assets 104 to remain powered-on for extended periods or, system 100 may enable the organization to install power management functionality on assets 104 that were not originally provided with power management programs. Additionally, system 100 may enable the organization to ensure that the asset owners follow power management policies by enabling the organization to automatically deploy power management policies to assets 104 using server 106.

In particular embodiments, agent 120 may further interact with asset 104 (e.g., the operating system or the hardware components of asset 104 such as the BIOS) to initiate one or more power management activities at asset 104. As an example and not by way of limitation, agent 120 may initiate a power management activity by interacting with a preexisting power management program on asset 104, or agent 120 may independently initiate a power management activity asset 104 without the assistance of any preexisting power management programs by interacting with asset 104 directly.

In particular embodiments, a power management activity could be initiated in response to an inactivity condition included in a policy, or in particular embodiments, a power management activity may be initiated in response to other conditions included in the policy. As an example and not by way of limitation, the policy may include an instruction requiring an asset 104 or a group of assets 104 be turned off or put in standby mode at a particular time of day. As an example and not by way of limitation, the policy may include an instruction for server 106 to turn off an asset 104 or group of assets 104 if server 106 becomes aware of a threat to those assets 104 such as for example a threat outbreak on network 102. A threat outbreak could be for example a virus attack, an infiltration of network 102 by a hacker, or any other threat to asset 104 or the information stored therein. For example, such threats could be detected using a threat detection and management program such as CA THREAT MANAGER or CA SECURITY COMMAND CENTER "SCC" each of which is produced by CA Inc., the assignee of the present disclosure.

A power management activity may be any activity initiated at asset 104 which changes the power consumption of asset 104. As an example and not by way of limitation, a power management activity may include lowering the power mode of asset 104 (e.g., transitioning from a more functional mode to a less functional mode), individually shutting off certain unused components of asset 104 until such components are needed, lowering the power consumption of one or more components of asset 104 (e.g., decreasing the screen brightness on a computer asset 104), or shutting asset 104 off. Since lowering the power mode of asset 104 may often entail shutting down or deactivating one or more components of asset 104 in order to save power, lower power modes may be associated with less functionality at asset 104.

In particular embodiments, agent 120 may implement a series of power management activities which may sequentially lower the power mode(s) of asset 104 as the duration of inactive time at asset 104 increases, until finally, agent 120 shuts asset 104 off. For example, if asset 104 is operating in standby mode (e.g., in an intermediate power mode wherein asset 104 operates at less than full capacity), agent 120 may continue monitoring the activity of asset 104, and if agent 120 continues to detect idle operation for a predetermined period of time, agent 120 may further proceed by shutting asset 104 down (e.g., either on its own initiative or at the behest of server 106). One of ordinary skill in the art will appreciate that the above-described power management activities were presented for the sake of explanatory simplicity and will further appreciate that the present disclosure contemplates initiating any suitable power management activity to lower the power consumption of asset 104.

In particular embodiments, the determination of whether to initiate a power management activity may be made by either server 106 or agent 120. For instance, server 106 may analyze alerts from agent 120 indicating that asset 104 is idle and may decide to implement a power management activity at asset 104, or, in particular embodiments, agent 120 may decide on its own initiative to implement a power management activity based on its analysis of usage statistics from asset 104. Thus, agent 120 may initiate actions (e.g., activate a power management activities) in either an autonomous mode (e.g., on its own initiative) or in a "slave" mode (e.g., under the control of an outside source such as server 106).

For example, in an autonomous mode, agent 120 may determine that asset 104 is idle by comparing usage statistics from asset 104 with the policy stored at agent 120 and may initiate a power management activity to lower the power mode of asset 104 based on its own determination of inactivity. In a slave mode, agent 120 may receive a command issued by server 106 to initiate a power management activity based on server 106's analysis of the alerts generated by agent 120. As an additional example and not by way of limitation, in a slave mode, agent 120 may receive a command from the owner of asset 104 (e.g., through server 106) to change the current power mode of asset 104 and may initiate a power management activity to raise or lower the power mode of asset 104 in accordance with the owner's command.

In particular embodiments, if agent 120 or server 106 determines that a power management activity should be initiated at asset 104, server 106 may generate an alert requesting permission from an owner of asset 104 to initiate the power management activity. As one example, since certain types of power management activities (e.g., shutting asset 104 off) may erase or alter data residing on asset 104 (e.g., data in memory 112), the owner's permission may be sought before initiating a particular type of power management activity in order to avoid erasing data from asset 104 which the owner may later need. For example, before shutting down asset 104, agent 120 may request permission to do so from the owner of asset 104 in order to allow the owner to determine whether the power management activity would have negative consequences. Depending upon the design of system 100, system 100 may be configured to never ask permission before initiating a power management activity, or system 100 may be configured to request permission before initiating various types of power management activities.

By requesting permission from the owner to initiate a power management activity, system 100 may enable the owner to determine whether such an activity would erase important data or close important programs currently active on asset 104. Accordingly, if the owner feels that asset 104 should be left in its current state, the owner may deny permission to initiate the power management activity at asset 104. Depending upon design, the asset owner may further reply with a reason not to initiate the power management activity.

In an example scenario, agent 120 may request permission to implement a power management activity by instructing server 106 to send a communication (e.g., e-mail, SMS message, helpdesk ticket, etc) to the owner requesting permission to shut asset 104 down. If the owner agrees that asset 104 should be shut down, then the owner may respond to server 106 with instructions to shut asset 104 down. Accordingly, server 106 may then instruct agent 120 to shut asset 104 down in accordance with the owner's instructions. One of ordinary skill in the art will appreciate that the above described scenario was described for explanatory clarification and will further appreciate that the present disclosure contemplates any suitable notification method using any suitable components of system 100 to enable communication between a user of system 100, agents 120, and central server 106.

As mentioned above, server 106 may record alerts generated by agent 120 in a record 124 associated with asset 104 stored, for example, in memory 112. As an example and not by way of limitation, each asset 104 may have an associated record 124 containing all of the alerts (e.g., power mode changes, power management notifications, inactivity alerts, etc.) that have been generated regarding that asset 104. In particular embodiments, server 106 may analyze record 124 by comparing information stored in records 124 against a predetermined list of use criteria and may determine that asset 104 is being inefficiently used. In particular embodiments, server 106 may periodically open and scan records 124 to determine whether any assets 104 are being inefficiently used, or server 106 may scan a particular record 124 to determine whether asset 104 is being inefficiently used each time a new alert is added to that record 124. The present disclosure contemplates using any suitable occurrence to trigger a scan of record(s) 124. Upon determining that asset 104 is being inefficiently used, server 106 may respond, for example, by notifying a member or group within the organization that asset 104 should be reclaimed for other purposes by the organization (e.g., put to another use or recollected into the organization's general pool of available resources).

As an example and not by way of limitation, if server 106 determines that asset 104 is being inefficiently used, server 106 may issue a work flow order to a member of the organization instructing the member to disconnect asset 104 and return asset 104 to the organization's warehouse. As an additional example and not by way of limitation, in cases where asset 104 is associated with an owner, server 106 may notify a member of the organization that asset 104 may be reclaimed from its owner, or server 106 may issue a notification to the owner of asset 104 requesting the owner to return asset 104 to the organization's general pool of resources.

Server 106 may determine that asset 104 is being inefficiently used, for example, by comparing information stored in records 124 against a predetermined list of use criteria. In particular embodiments, the use criteria may be part of a larger policy for asset management. Use criteria may be any suitable criteria established (e.g., by the organization) to indicate that asset 104 is being inefficiently used. For example, a use criteria may indicate that asset 104 is being inefficiently used if asset 104 has remained in its lowest available power mode (e.g., turned off) for a predetermined amount of time. As another example and not by way of limitation, a use criteria may indicate that asset 104 is being inefficiently used if a number of inactivity alerts received by server 106 regarding asset 104 exceeds a predetermined threshold. One of ordinary skill in the art will appreciate that the above-described use criteria were presented for the sake of explanatory clarification and will further appreciate that the present disclosure contemplates using any suitable number and type of use criteria to identify that asset 104 is being used inefficiently.

In particular embodiments, records 124 may be used for reporting and auditing purposes by the organization. For example, the organization may use system 100 to create reports describing the usage for particular types of assets 104, reports describing the usage for assets 104 associated with a particular owner, reports describing the usage for assets 104 located in a particular geographic region, or reports describing the usage for assets 104 organized according to any other suitable criteria. Reports may further be generated on an individual basis for each asset 104.

In particular embodiments, reports may be disseminated to various stakeholders in the organization having an interest in assets 104 (e.g., the owner, a product line manager, an Information Technology "IT" manager, etc.) to enable the organization to monitor and manage assets 104 more efficiently. For example, a report may indicate a list of owners that are not using their assets 104 efficiently, or indicate a list of assets 104 that should be reclaimed because they are not being used efficiently.

Central server 106 may be any component of hardware or software or combination of such components capable of monitoring assets 104. In particular embodiments, central server 106 may be another computing device including an interface 110, one or more processors 114, and a memory 112 comprising or capable of receiving logical program instructions recorded on a tangible computer readable media 116 (e.g., a cd-rom, a flash drive, a floppy disk, etc.) that when executed by processors 114 provide accountable resource usage for assets 104 in accordance with the present disclosure. In particular embodiments, a user may interact with server 106 either directly or indirectly via any suitable input device(s) 118 (e.g., a keyboard or a mouse) and output device(s) 116 (e.g., a monitor) connected either directly or indirectly to the server 106. In particular embodiments, all of the functionality and features herein may reside and be performed on a single server 106, or may reside and be performed in a distributed fashion amongst multiple servers 106. As an example and not by way of limitation, server 106 could be implemented as a Win32 application or a web-based graphical user interface (GUI) accessible, for example through network 102.

Processor 114 may be a microprocessor, controller, or any other suitable computing device, resource, or combination of hardware, software and/or encoded logic operable to provide, either alone or in conjunction with other components of network 102 (e.g., another server 106) computer-based functionality of particular embodiments of the present disclosure. Accordingly, memory 112 may be any form of volatile or non-volatile memory including, without limitation, magnetic media, optical media, random access memory (RAM), read-only memory (ROM), removable media, or any other suitable local or remote memory component and interface 110 may comprise any hardware, software, or encoded logic operable to send and receive information to and from other components of network 102 such as electronic assets 104.

The components of system 100 (e.g., electronic assets 104 and a central server 106) may be coupled to network 102 via one or more links 108. In particular embodiments, links 108 may each include one or more wireline, wireless, or optical links. In particular embodiments, one or more links 108 each include a LAN, a WLAN, a WAN, a MAN, a portion of the Internet, or another link 108 or a combination of two or more such links 108. Each of the components coupled to network 102 communicate with each other via use of network 102.

In particular embodiments, network 102 may include one or more local area networks (LAN), one or more wireless LANs (WLAN), one or more wide area networks (WAN), one or more metropolitan area networks (MAN), a portion of the Internet, or another form of network or a combination of two or more such networks. The present disclosure contemplates any suitable network 102 or combination of networks 102. In particular embodiments, components of system 100 are distributed across multiple cities or geographical regions connected by network 102. In particular embodiments, network 102 may be represented by multiple distinct, but interconnected networks that share components or distinctly contain similar components. In particular embodiments, a user may view and manage assets 104 and server 106 through a website 200 accessible through network 102 and supported by server 106.

Figure 2:
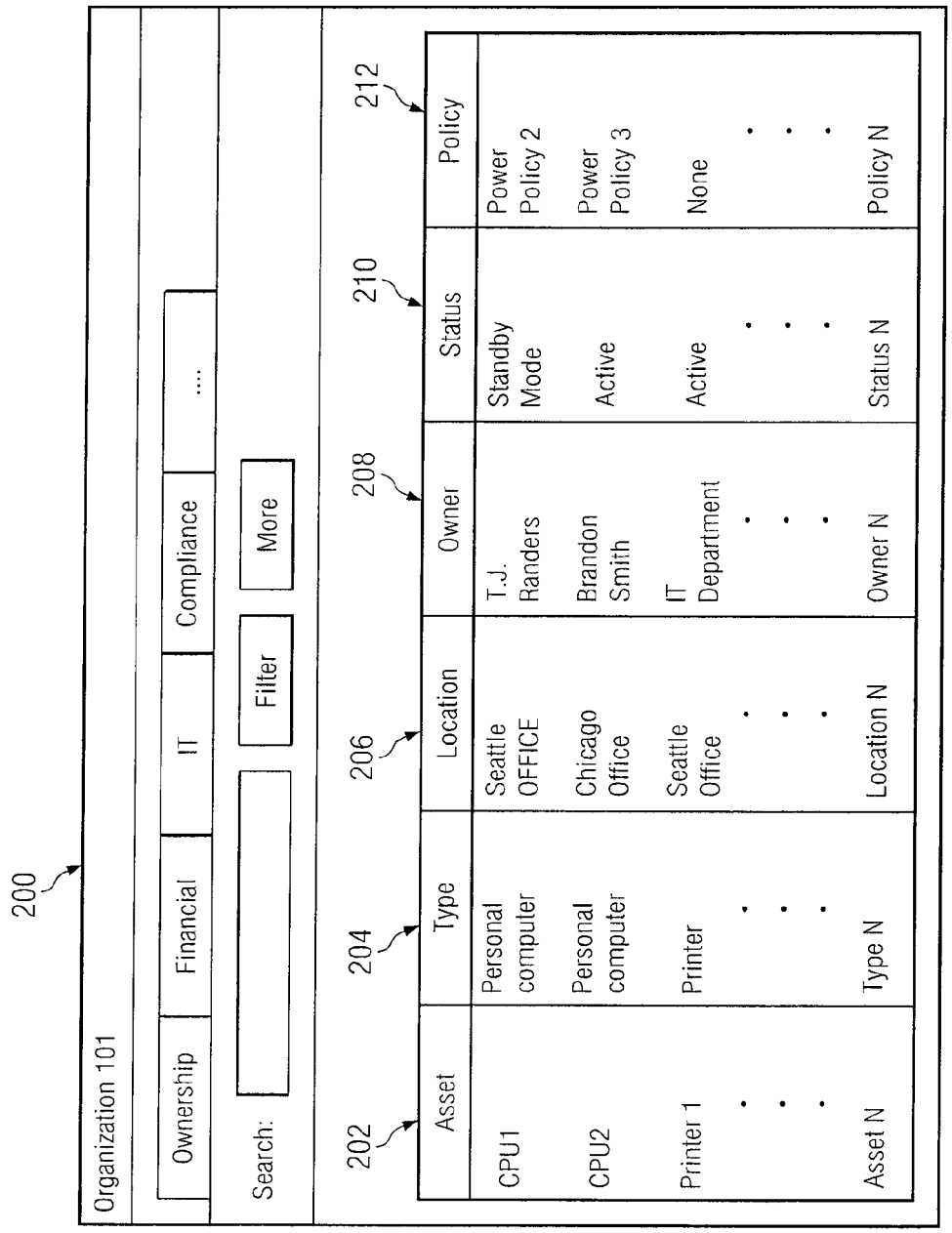
FIG. 2 illustrates and example webpage of an example website that may be used to access various features provided by the system of FIG. 1 according to an example embodiment of the present disclosure.

FIG. 2 illustrates an example webpage from a website 200 (e.g., a self service portal) through which users of system 100 may access various reports and information generated by server 106 or other components of system 100 regarding assets 104. In particular embodiments, website 200 may display each of the organization's assets 104 as well as various data fields containing information related to each asset 104. As an example and not by way of limitation, website 200 may include an asset field 202 that include a unique name for each asset 104, a type field 204 that includes a type of each asset, a location field 206 that displays a geographic location for each asset 104, an owner field 208 that displays an owner for each asset 104, a status field 210 that displays a current power mode for each asset 104, and a policy field 212 that displays a particular power management policy associated with each asset 104.

In particular embodiments, website 200 may enable a user to access various administrative facilities of system 100. For example, a user may use website 200 to generate reports about assets 104, create and associate power management policies with assets 104, or define owner profiles 122. Additionally, website 200 may enable a user to search or sort assets 104 using the information contained in fields 202-212 in order, for example, to assist the user in performing administrative tasks such as those described above.

In particular embodiments, website 200 may enable a user to view the current power mode of asset 104 and may enable the user to issue commands to asset 104 using agent 120. For example, an owner may use website 200 to check the current power mode of his asset 104, and if asset 104 is turned off, the owner may use web site 200 to re-activate asset 104 either directly by issuing an electronic command which turns asset 104 on electronically, where possible, or indirectly by creating a work request which informs an administrator or other member of the organization to reactivate the owner's asset 104. Additionally, if the owner is in close proximity to asset 104, the owner may reactivate asset 104 by approaching it directly and turning it on. In any case, once asset 104 is reactivated, agent 120 may generate an alert describing the reactivation event to server 106. Thus, system 100 may enable an owner to change the power mode of his asset 104 using website 200. In particular embodiments, a request to wake up asset 104 can initiate a simple task like sending a message (e.g., an email) to an administrator or may initiate a more complex workflow like creating a helpdesk ticket.

As a further example of remote asset control (e.g., using website 200), system 100 may further be accessed by one or more external systems or services such as a helpdesk or Security Operating Center ("SOC") that may use system 100 to activate or deactivate an asset 104 or group of assets 104 for various purposes. For example, the helpdesk may use system 100 to power down a particular group of assets 104 located in a particular geographic region due to a localized electrical storm or for maintenance purposes or to conserve energy. Likewise, the SOC may power down a particular group of assets 104 due to a threat outbreak such as a virus infiltration. In any case, depending upon design, system 100 may enable an external system or service to change the power mode of an asset 104 or group of assets 104 for any number of reasons using, for example, website 200.

In particular embodiments, users of system 100 may access website 200 through a user account which may limit the user's rights in system 100 based on the user's role within the organization. For example, system administrators may have the right to modify or delete information in system 100 (e.g., policies, owner profiles 122, etc.) while lower level employees may only have the right to view the status of assets 104. Likewise, the ability to change the power mode of an owner's asset 104 may be limited to the asset owner. Thus, system 120 may use role-based security functionality to limit access to content within system 100 or to limit access to other administrative features of system 100 by role.

In particular embodiments, server 106 may organize and present data (e.g., real time data) regarding assets 104 to a user in one or more "dash-board" views in website 200 (e.g., a web portal). Dashboards (e.g., user interface screens on website 200) may organize and present the information in system 100 in a user-friendly, topically based manner. For example website 200 may include dashboards related to finance, regulatory compliance, Information Technology, product line management, asset ownership, facility management, etc. The reporting and dashboard functionality of system 100 may be used by several functions in the organization, and may provide reports pertaining to several areas of the organization. As an example and not by way of limitation, system 100 may be used to facilitate finance and regulatory compliance by providing an on-line and real-time compliance dashboard showing whether assets 104 are currently compliance with various policies, and by reporting on cross departmental chargeback, monetary savings (e.g., either potential or realized), and sustainability. As an additional example and not by way of limitation, system 100 may be used to facilitate various IT initiatives by providing an on-line and real time usage dashboard showing the real time usage of assets 104, and by reporting on asset usage (e.g., to provide product line managers and lab owners with tighter control of their assets 104), financial data (e.g., tied to usage for accurate charge backs), and ownership mapping. As an additional example and not by way of limitation, system 100 may be used to make the organization's facilities more efficient by reporting on air conditioning and heating expenditures related to asset usage and saving related to implementing power management policies and reporting on saved lease space due to collection and organization of unused assets 104.

In particular embodiments, various features of system 100 may be integrated, for example, as part of an existing system management, helpdesk, or other program such as UNICENTER ASSET MANAGEMENT PORTFOLIO, CA SERVICE DESK, CA AUDIT, CA ELM, OR CA HOST-BASED INTRUSION PREVENTION SYSTEM "HIPS", each of which is produced by CA Inc., the assignee of the present disclosure.

Once system 100 is implemented by the organization, each component of system 100 may contribute various features to the overall functionality of system 100. For example, in particular embodiments, agent 120 may be installed on asset 104 and may monitor and collect fundamental activities (e.g., Vital Life Signs) of asset 104. Based upon the configuration of system 100, agent 120 may send events or alerts to central server 106 (e.g., over network 102), for example to indicate that asset 104 is inactive. In particular embodiments, agent 120 may interact with the OS or with the BIOS of asset 104 directly, where possible, and activate power saving activities on asset 104, either in an autonomous mode or slave mode. If asset 104 is operating in a lower power mode (e.g., standby mode), agent 120 may continue monitoring asset 104, and according to a policy may shut asset 104 down after an extended period of inactivity. Furthermore, agent 120 may send an alert to server 106 to notify server 106 that asset 104 is being shut down. In cases where agent 120 is not able to initiate power management activities on asset 104, agent 120 may be used for event collection and monitoring purposes.

In particular embodiments, server 106 may function as a central administration point for system 100. Server 106 may be used to develop, deploy and manage relevant policies (e.g., power management policies) through network 102. Server 106 may also store, analyze and archive events and alerts from one or more agents 120 distributed on assets 104, and may act upon the received events and alerts, for example, by instructing the one or more agents 120 to initiate power management activities on assets 104. In particular embodiments, server 106 may be used for mapping assets 104 to owners (e.g., using owner profiles 112), and for generating and sending reports and mails to stakeholders (e.g., people with an interest in asset 104) as well to the owner of asset 104, for example, upon a change in status (e.g., power mode) of asset 104.

In particular embodiments, website 200 may include a self service portal that may be used by the owner of an asset 104 to check a current status of asset 104 and to re-activate asset 104, for example if asset 104 is shut down. In particular embodiments, website 200 may enable the owner to reactivate asset 104 automatically (e.g. electronically), where possible, or manually (e.g., by permitting the owner to manually reactivate asset 104, or by enabling the owner to send a message, for example, a helpdesk ticket or workflow order to an administrator to reactivate asset 104). In particular embodiments, the website 200 may also be used, by stakeholders, for accessing the various reports and information generated by other subcomponents of system 100.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. A method for centralized power management, comprising:
linking an owner to an electronic asset using an owner profile stored in a memory, the electronic asset coupled to a server through a network;
receiving usage statistics and a power mode of the electronic asset from an activities agent installed on the electronic asset, wherein the usage statistics indicate whether the electronic asset is performing an action;
at the server, defining a policy comprising a first inactivity condition that, when satisfied by the usage statistics of the electronic asset, results in a first alert being received by the server from the agent, indicating inactivity of the electronic asset, the policy further comprising a first power management activity to be initiated at the electronic asset when the first inactivity condition is satisfied;
communicating the policy from the server to the agent;
determining whether the server or the agent is responsible to initiate power management activities based on a control mode;
determining whether the first inactivity condition is satisfied by comparing the usage statistics against the first inactivity condition;
in response to determining that the first inactivity condition is satisfied and that the server is responsible to initiate power management activities, initiating, by the server, the first power management activity at the electronic asset;
recording, at the server, the first alert in a collection of alerts received from the agent;
determining, at the server, based on a number of alerts indicating inactivity of the electronic asset in the collection of alerts, that the electronic asset is being inefficiently used and in response, providing a notification that the electronic asset is being inefficiently used; and
returning the electronic asset to a pool of available resources.

2. The method of claim 1, wherein the first power management activity comprises lowering the power mode of the electronic asset.

3. The method of claim 1, wherein:
the policy further comprises a second inactivity condition that, when satisfied by the usage statistics of the electronic asset, results in a second power management activity being initiated after the first power management activity, and further comprising:
receiving at the server a second alert from the agent when the second power management activity is initiated, the second alert indicating the initiation of the second power management activity; and
communicating the second alert to the owner.

4. The method of claim 1, further comprising:
requesting permission from the owner to initiate the first power management activity before initiating the first power management activity at the electronic asset; and
waiting to receive instructions from the owner before initiating the first power management activity at the electronic asset.

5. The method of claim 1, further comprising, issuing a workflow order notifying a user to disconnect the electronic asset if it is determined that the electronic asset is being inefficiently used.

6. The method of claim 1, wherein:
the action comprises a user-initiated action;
the inactivity condition comprises a duration of inactive time elapsed since the electronic asset last performed the user-initiated action; and
the first alert indicates a duration of inactive time elapsed since the electronic asset last performed the user-initiated action, and further comprising communicating the first alert to the owner.

7. The method of claim 1, wherein defining the policy comprises enabling a user to define the policy.

8. The method of claim 1, further comprising:
reporting a current power mode of the electronic asset to a user through a web page;
enabling the user to input an instruction to change the current power mode of the electronic asset; and
instructing the agent to change the current power mode of the electronic asset in accordance with the instruction when the instruction is received.

9. The method of claim 1, wherein the electronic asset comprises one of a plurality of electronic assets linked to the owner using the owner profile and coupled to the server through the network.

10. A centralized system for power management, comprising:
a server operable to:
link an owner to an electronic asset using an owner profile stored in a memory, the electronic asset coupled to the server through a network;

receive usage statistics and a power mode of the electronic asset from an activities agent installed on the electronic asset, wherein the usage statistics indicate whether the electronic asset is performing an action;

define a policy comprising a first inactivity condition that, when satisfied by the usage statistics of the electronic asset, results in a first alert being received by the server from the agent, indicating inactivity of the electronic asset, the policy further comprising a first power management activity to be initiated at the electronic asset when the first inactivity condition is satisfied;

communicate the policy to the agent;

determine whether the server or the agent is responsible to initiate power management activities based on a control mode;

determine whether the first inactivity condition is satisfied by comparing the usage statistics against the first inactivity condition;

receive the first alert from the agent when the first inactivity condition is satisfied;

in response to determining that the inactivity condition is satisfied and that the server is responsible to initiate power management activities, initiate the first power management activity at the electronic asset;

record the first alert in a collection of alerts in the memory;

determine, based on a number of alerts indicating inactivity of the electronic asset in the collection of alerts, that the electronic asset is being inefficiently used and in response, provide a notification that the electronic asset is being inefficiently used; and return the electronic asset to a pool of available resources.

11. The system of claim 10, wherein:
the policy further comprises a second inactivity condition that, when satisfied by the usage statistics of the electronic asset, results in a second power management activity being initiated; and
the server is further operable to:
receive a second alert from the agent when the second power management activity is initiated by the agent after the first power management activity, the second alert indicating the initiation of the second power management activity; and
communicate the second alert to the owner.

12. The system of claim 10, wherein:
the server is further operable to;
request permission from the owner to initiate the first power management activity before initiating the first power management activity at the electronic asset; and
wait to receive instructions from the owner before initiating the first power management activity at the electronic asset.

13. The system of claim 10, wherein:
the server is further operable to:
issue a workflow order notifying a user to disconnect the electronic asset if the server determines that the electronic asset is being inefficiently used.

14. The system of claim 10, wherein the server is further operable to define the policy by enabling a user to define the policy.

15. The system of claim 10, further comprising a web interface operable to report a current power mode of the electronic asset to a user through a web page; and wherein the server is further operable to:
receive an instruction from the user to change the current power mode of the electronic asset; and
instruct the agent to change the current power mode of the electronic asset in accordance with the instruction.

16. Logic encoded in a tangible computer readable media, a computer including one or more processors and a memory operable when executed the logic to:
link an owner to an electronic asset using an owner profile stored in a memory, the electronic asset coupled to a computer through a network;
receive usage statistics and a power mode of the electronic asset from an activities agent installed on the electronic asset, wherein the usage statistics indicate whether the electronic asset is performing an action;
define a policy comprising a first inactivity condition that, when satisfied by the usage statistics of the electronic asset, results in a first alert being received by the server from the agent, indicating inactivity of the electronic asset, the policy further comprising a first power management activity to be initiated at the electronic asset when the first inactivity condition is satisfied;
communicate the policy to the agent;
determine whether the server or the agent is responsible to initiate power management activities based on a control mode;
receive the first alert from the agent when the first inactivity condition is satisfied;
in response to determining whether the inactivity condition is satisfied and that the server is responsible to initiate power management activities, initiate the first power management activity at the electronic asset;
record the first alert in a collection of alerts received from the agent in the memory;
determine, based on a number of alerts indicating inactivity of the electronic asset in the collection of alerts, that the electronic asset is being inefficiently used and in response, provide a notification that the electronic asset is being inefficiently used; and
return the electronic asset to a pool of available resources.

17. The logic of claim 16, wherein:
the policy further comprises a second inactivity condition that, when satisfied by the usage statistics of the electronic asset, results in a second power management activity being initiated after the first power management activity;
the computer is further operable to:
receive a second alert from the agent when the second power management activity is initiated, the second alert indicating the initiation of the second power management activity; and
communicate the power management notification to the owner.

* * * * *